(12) United States Patent
Tudosie

(10) Patent No.: US 11,292,339 B2
(45) Date of Patent: Apr. 5, 2022

(54) METHOD FOR DISPLAYING SAFETY-RELEVANT INFORMATION ON A DISPLAY DEVICE OF A VEHICLE

(71) Applicant: Cosmin Tudosie, Friedrichshafen (DE)

(72) Inventor: Cosmin Tudosie, Friedrichshafen (DE)

(73) Assignee: Cosmin Tudosie, Waldshut-Tiengen (DE)

( * ) Notice: Subject to any disclaimer, the term of this patent is extended or adjusted under 35 U.S.C. 154(b) by 156 days.

(21) Appl. No.: 16/484,782

(22) PCT Filed: Jan. 8, 2018

(86) PCT No.: PCT/EP2018/050305
§ 371 (c)(1),
(2) Date: Aug. 8, 2019

(87) PCT Pub. No.: WO2018/145834
PCT Pub. Date: Aug. 16, 2018

(65) Prior Publication Data
US 2020/0239018 A1     Jul. 30, 2020

(30) Foreign Application Priority Data
Feb. 10, 2017 (DE) .................... 10 2017 202 172.1

(51) Int. Cl.
*B60K 35/00* (2006.01)
*B60W 60/00* (2020.01)
(Continued)

(52) U.S. Cl.
CPC ............. *B60K 35/00* (2013.01); *B60W 30/09* (2013.01); *B60W 50/14* (2013.01);
(Continued)

(58) Field of Classification Search
CPC ............. B60K 35/00; B60K 2370/179; B60K 2370/191; B60K 2370/1529;
(Continued)

(56) References Cited

U.S. PATENT DOCUMENTS

| | | | |
|---|---|---|---|
| 2008/0079555 A1* | 4/2008 | Wang ..................... | B60Q 1/448 340/479 |
| 2016/0039412 A1* | 2/2016 | Stahlin ..................... | B60T 8/17 701/41 |
| 2016/0318511 A1* | 11/2016 | Rangwala .............. | G08G 1/162 |

FOREIGN PATENT DOCUMENTS

| | | |
|---|---|---|
| DE | 102012002695 A1 | 8/2013 |
| DE | 102017202172.1 | 2/2017 |

(Continued)

OTHER PUBLICATIONS

International Search Report from European Patent Office ISA in PCT/EP2018/050305 dated Apr. 3, 2018 (2pgs in English, 2 pgs. In German).

(Continued)

*Primary Examiner* — Muhammad Shafi

(57) ABSTRACT

The disclosure relates to a method for displaying safety-relevant information on a display device of a vehicle. A speed of the vehicle, environment data representing an environment of the vehicle, a driver reaction time, and an emergency braking reaction time for an emergency braking driver assistance function are input, and used to superimpose an emergency braking marker and a driver intervention marker on the map representing a lane in which the vehicle is travelling in the display device. The emergency braking marker represents a future point in time and/or future location for an intervention of the emergency braking driver assistance function, and the driver intervention marker represents a future point in time and/or a future location for the (Continued)

latest possible intervention of the driver prior to the intervention of the emergency braking driver assistance function.

20 Claims, 2 Drawing Sheets

(51) Int. Cl.
*B60W 30/09* (2012.01)
*B60W 50/14* (2020.01)

(52) U.S. Cl.
CPC .... *B60W 60/0027* (2020.02); *B60W 60/0059* (2020.02); *B60K 2370/1529* (2019.05); *B60K 2370/166* (2019.05); *B60K 2370/167* (2019.05); *B60K 2370/168* (2019.05); *B60K 2370/179* (2019.05); *B60K 2370/193* (2019.05); *B60K 2370/48* (2019.05); *B60K 2370/5915* (2019.05); *B60W 2050/146* (2013.01)

(58) Field of Classification Search
CPC ........ B60K 2370/166; B60K 2370/167; B60K 2370/168; B60K 2370/48; B60K 2370/5915; B60K 2370/193; B60K 2370/188; B60K 2370/334; B60W 60/0059; B60W 60/0027; B60W 30/09; B60W 50/14; B60W 2050/146; B60T 2201/03
USPC ........................................................ 701/301
See application file for complete search history.

(56) References Cited

FOREIGN PATENT DOCUMENTS

| | | |
|---|---|---|
| EP | 2618108 A1 | 7/2013 |
| JP | 2015196403 A | 11/2015 |
| WO | WO 2011/108091 A1 | 9/2011 |
| WO | WO-2011108091 * | 9/2011 |
| WO | WO 2013/064705 A1 | 5/2013 |
| WO | WO 2018/145834 A1 | 8/2018 |

OTHER PUBLICATIONS

Office Action in DE 102017202172.1 dated Aug. 28, 2017 (10 pages).

* cited by examiner

METHOD FOR DISPLAYING SAFETY-RELEVANT INFORMATION ON A DISPLAY DEVICE OF A VEHICLE

RELATED APPLICATIONS

This application is a filing under 35 U.S.C. § 371 of International Patent Application PCT/EP2018/050305, filed Jan. 8, 2018, claiming priority to German Patent Application 10 2017 202 172.1, filed Feb. 10, 2017. All applications listed in this paragraph are hereby incorporated by reference in their entireties.

TECHNICAL FIELD

The present disclosure relates to a method and a device for displaying safety-relevant information on a display device in a vehicle.

BACKGROUND

Modern vehicles can be equipped with a head-up display for displaying information in the driver's field of vision.

SUMMARY

Based on this, the present disclosure provides an improved method for displaying safety-relevant information on a display device in a vehicle, a corresponding device, and a corresponding computer program. Advantageous embodiments can be derived from the following description.

A method for displaying safety-relevant information on a display device in a vehicle is presented, wherein the method comprises the following steps: inputting a speed of the vehicle, environment data representing the environment of the vehicle, a driver reaction time that represents the reaction time of a driver of the vehicle determined in a reaction test, and an emergency braking reaction time that represents a reaction time for an emergency braking driver assistance function of the vehicle in response to detection of an emergency braking situation; and superimposing an emergency braking marker and a driver intervention marker onto a map representing a roadway for the vehicle on the display device, taking the speed, environment data, driver reaction time, and emergency braking reaction time into account, wherein the emergency braking marker represents a future point in time and/or future location for an intervention by the emergency braking driver assistance function, and the driver intervention marker represents a future point in time and/or future location for the latest possible intervention of the driver prior to the intervention of the emergency braking driver assistance function.

The display device can be a head-up display. The display device can be designed, e.g., to project information on the vehicle windshield, and display this information in the driver's field of vision as virtual images. Environment data can be understood to be information provided by a vehicle environment sensor, and/or information regarding the vehicle's environment received via a communication interface for communicating with other road users. A reaction test can be, e.g., a test that can be initiated by a driver or the vehicle for determining the driver's reaction time. An emergency braking driver assistance function can be understood to be a driver assistance function of the vehicle that is configured to automatically brake the vehicle in an emergency situation, i.e., without the engagement of the driver. An emergency braking reaction time can be, e.g., a prior warning period for triggering the emergency braking driver assistance function. The emergency braking driver assistance function can process, e.g., the environment data, the speed of the vehicle, or other suitable parameters regarding a vehicle's driving situation, to detect the emergency braking situation. In particular, the emergency braking marker and the driver intervention marker can be superimposed on the map in a position on or adjacent to the roadway that is dependent on the speed, environment, driver reaction time or emergency braking reaction time.

The approach described herein is based on the knowledge that by superimposing corresponding markers onto a virtual map of a roadway, a point in time, or a location at which an emergency braking driver assistance function in a vehicle would be expected to intervene in driving situation, or a driver of the vehicle is still able to intervene in the driving situation early enough through with an appropriate reaction, can be graphically displayed, e.g., based on the vehicle's approaching of an object located in the environment of the vehicle. As a result, the driver is able to drive more quickly, in particular in poor weather and with poor visibility, because he is thus provided with an additional control opportunity in the estimation of his own reaction time, and the reaction time for the vehicle.

According to one embodiment, a distance between the driver intervention marker and the emergency braking marker can be modified in the superimposing step based on a change in the distance between the vehicle and an object located in the environment. This results in a dynamic adaptation of the driver intervention marker and the emergency braking marker to a vehicle's driving situation.

According to another embodiment, an arrow can be superimposed parallel to the roadway, and/or pointing toward the emergency braking marker that serves as the driver engagement marker in the superimposing step. As a result, the point in time or the location of the latest possible driver intervention can be particularly effectively emphasized.

It is advantageous when a line crossing the roadway is superimposed as the emergency braking marker in the superimposing step. As a result, the emergency braking marker can be particularly effectively emphasized.

Moreover, the method can comprise a step for setting an aspect ratio of the map taking the speed into account. By way of example, the map can be elongated at higher speeds or shortened at lower speeds. As a result, the map can be dynamically adapted to a necessary range of vision of the driver based on the speed of the vehicle.

According to another embodiment, the emergency braking reaction time can be determined in the determining step by adding the driver reaction time to a vehicle reaction time that represents a reaction time for the vehicle when processing a driver command. A prior warning period for the emergency braking driver assistance function can be reliably determined with this embodiment.

It is advantageous when the emergency braking marker and/or the driver intervention marker are projected in the superimposing step on the vehicle's windshield. By way of example, the markers can appear in strips in the projection on a lateral or lower edge of the windshield on the driver's side. Alternatively, the markers can be projected at a virtual spacing to the windshield in the projection, e.g., by superimposing them on an actual environment of the vehicle. As a result, the markers can be projected into the field of vision of the driver such that the driver can see the markers without additional head movement.

It is also advantageous when the lane in the roadway on which the vehicle is travelling is highlighted in the map in the superimposing step. As a result, it is possible to quickly discern which lane the vehicle is currently travelling in.

According to another embodiment, at least one object symbol that represents the object in the roadway can be superimposed on the map in the superimposing step. By way of example, the object symbol can represent another road user, e.g., another vehicle, a bicyclist, or a pedestrian, or it can represent an obstruction on the roadway, e.g., a tree, a pylon, or a streetlight, located in the vehicle's environment. This provides the driver with a good overview of the current driving situation with a brief look at the map.

The size of the object symbol can be modified in the superimposing step based on a change in the distance between the vehicle and the object. As a result, the change in distance can be effectively emphasized.

The method can also comprise a step for masking a region of the environment in the map that is not visible to the driver. The masking can be in the form of a shading or blurring of the region that is not visible. As a result, the driver can be notified of poor visibility.

As a result, the driver can slow down accordingly, or, e.g., assume the risk of engaging the emergency braking driver assistance function.

The approach presented herein also results in a device that is configured to execute, actuate or implement the steps of any of the variations of the method presented herein in corresponding mechanisms. An object of the present disclosure can also be quickly and efficiently obtained through this embodiment variation in the form of a device.

A device can be understood to be an electric device in the present case, which processes sensor signals and outputs control and/or data signals based thereon. The device can have an interface in the form of hardware or software. Hardware interfaces can be part of a so-called system ASIC, which comprises the various functions of the device. The interfaces can also be autonomous integrated circuits or at least composed of discrete components. Software interfaces can be software modules that are present on a microcontroller in addition to other software modules.

In an advantageous embodiment, the device controls the vehicle. For this, the device can access, e.g., sensor signals such as acceleration, pressure, steering angle, or environment sensor signals. The actuation is obtained via actuators such as braking or steering actuators, or a vehicle motor control device.

A computer program product or computer program that contains program code that can be stored on a machine-readable memory or storage medium such as a semiconductor memory, a hard disk memory, or an optical memory, and used for executing, implementing and/or actuating the steps of the method according to any of the embodiments described above is also advantageous, in particular when the program product or program is executed on a computer or a device.

BRIEF DESCRIPTION OF THE DRAWINGS

The present disclosure shall be explained in greater detail based on the examples in the attached drawings.

DETAILED DESCRIPTION

In the following description of preferred exemplary embodiments of the present disclosure, the same or similar reference symbols are used for the elements in the figures that have similar functions, wherein the descriptions of these elements shall not be repeated.

Figure 1:
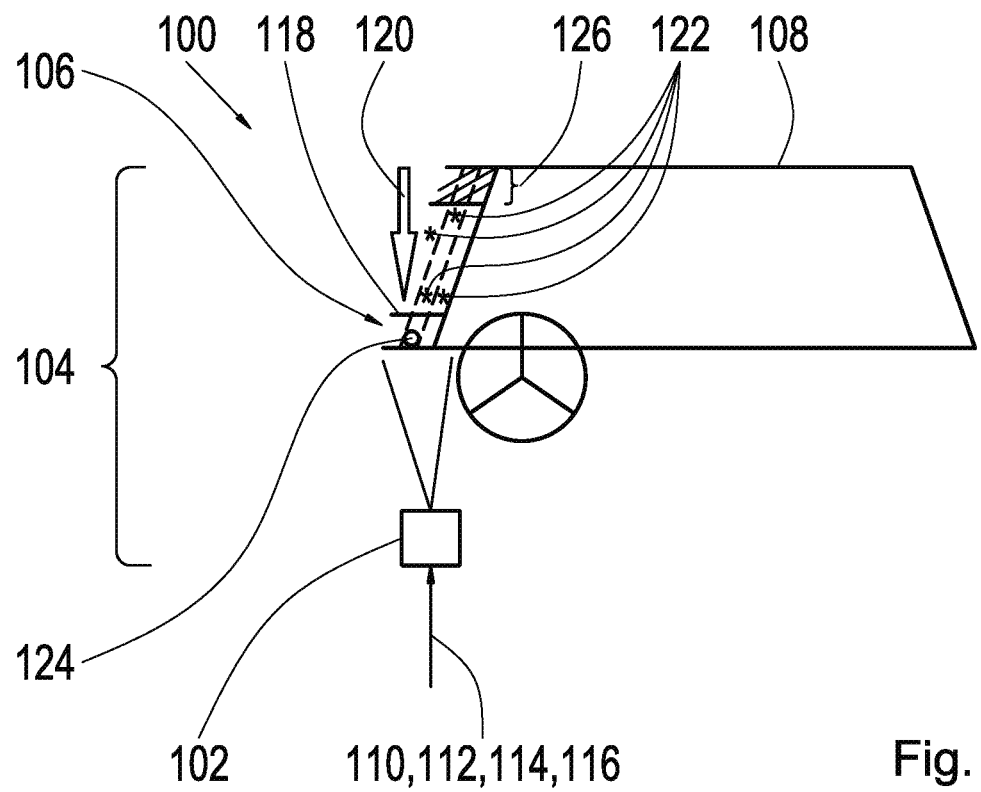
FIG. 1 shows a schematic illustration of a vehicle that has a device according to an exemplary embodiment.

FIG. 1 shows a schematic illustration of a vehicle 100 that has a device 102 according to an exemplary embodiment. The vehicle 100 has a display device 104 configured according to this exemplary embodiment to project safety-relevant information, in this case a virtual map 106 of a roadway on which the vehicle 100 is travelling, onto the windshield 108 of the vehicle 100. By way of example, the display device 104 projects the map 106 in FIG. 1 onto the windshield 108 such that the map 106 appears as a vertical strip on a left-hand lateral edge of the windshield 108 from the driver's perspective. Depending on the exemplary embodiment, the map 106 can also appear at a virtual spacing in front of or behind the windshield 108 from the perspective of the driver, the position of which is indicated schematically in FIG. 1 by a steering wheel, in particular by superimposing it on the actual environment in which the vehicle 100 is located.

If the vehicle is a right-hand steering vehicle, the display is then superimposed in the strip on the right of the windshield.

If the steering wheel/control of the seat position for the driver, e.g., is in the center, the display can be, e.g., in the center, or close to the center of the windshield. The driver can thus change the size and position of the display, and also add or remove individual elements.

The device 102 is configured to input speed data 110 representing a current speed of the vehicle 100, environment data 112 representing an environment of the vehicle 100, a driver reaction time 114 representing a reaction time of the driver determined in a reaction test, and an emergency braking reaction time 116 representing a reaction time of an emergency braking driver assistance function in the vehicle 100 in reaction to an emergency situation, and to use these data to superimpose an emergency braking marker 118 and a driver intervention marker 120 on the map 106. In this case, the emergency braking marker 118, depicted as a line crossing the roadway in this exemplary embodiment, represents a point in time or a location on the roadway shown in the map 106 at which the emergency braking driver assistance function would automatically intervene if another vehicle, such as a vehicle travelling in front of the vehicle 100 in the same lane, is closer than the emergency braking marker 118, without the driver of the vehicle 100 first taking appropriate action. The driver intervention marker 120 appears according to FIG. 1, by way of example, as an arrow parallel to the roadway, pointing toward the emergency braking marker 118, functioning as a vehicle proximity indicator for indicating a point in time, or a location, for the latest possible intervention of the driver prior to the automatic intervention of the emergency braking driver assistance function. The tip of the arrow approaches the emergency braking marker 118 at the rate that the distance between the vehicle 100 and the vehicle in front decreases.

The reaction time of the driver can also be calculated over time. The system assumes that the reaction time is slow in this case. If it is possible to monitor the driver precisely, the reaction time can be adjusted in real time, if the driver is distracted, for example.

It is likewise conceivable to adjust the reaction time based on the season, daily travel, etc. This can be taken into account in calculating the display. It is likewise conceivable to calculate the maximum reaction time from the time determined in the test, and the current situation. This maximum reaction time can then be used for the display.

The device 102 is also configured to highlight a lane in which the vehicle 100 is currently travelling in the map 106 in an appropriate manner, by flashing the current lane, or by superimposing a suitable driving lane marker 124 on the current driving lane.

The other vehicles in the environment of the vehicle 100 are likewise indicated by the device 102 in the form of corresponding object symbols 122, also superimposed on the roadway in the map 106. The respective size of the object symbol 122 can vary, depending on a respective distance of the vehicle represented by the object symbol 122 to the vehicle 100.

According to the exemplary embodiment shown in FIG. 1, the device 102 is also configured to appropriately mask a region 126 in the map 106 that the driver of the vehicle 100 cannot see due to poor visibility, in this case by shading the region 126 that is not visible.

Figure 2:
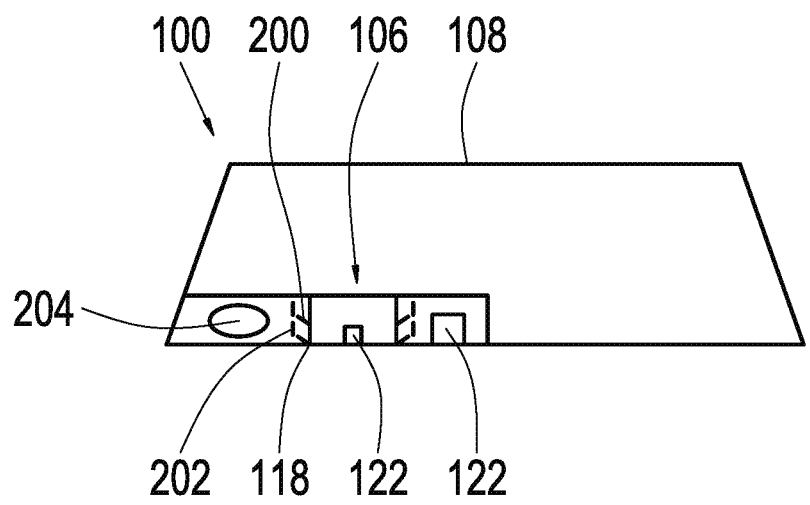
FIG. 2 shows a schematic illustration of the vehicle in FIG. 1.

FIG. 2 shows a schematic illustration of the vehicle in FIG. 1. In differing from FIG. 1, the map 106 is projected such that it extends substantially horizontally along a lower edge of the windshield 108 in the field of vision of the driver.

The object symbols 122 shown in FIG. 2 are different sizes, depending on their respective distances to the vehicle 100. The emergency braking marker 118 is superimposed here as a rectangular outline around one of the object symbols 122, indicating the intervention threshold point for the emergency braking drive assistance system.

The shape of the outline can depend on which symbols the driver desires to have displayed in the corresponding fields. If they are, e.g., only round "symbols," then a round outline is advantageous, because this gives the driver a better overview on the basis of the displayed data than if a circle or hexagon, etc. were shown in a rectangular outline.

The driver should also have the possibility of modifying the displayed shapes and colors himself. He can make all of the symbols round, for example, but some could have a red outline, and be filled with other colors, or he can place letters inside the various geometric figures, if desired.

The highlighting of the current lane in which the vehicle 100 is travelling is obtained according to this exemplary embodiment by a grid 200. Additional lane markings 202 are superimposed to the right and left of the current lane in which the vehicle is traveling.

The device can also be configured to highlight a lane to which the vehicle may change lanes in an appropriate manner, by superimposing a lane change marker 204 on the lane in question, in this case a lane to the left or right of the lane in which the vehicle is currently travelling.

The approach presented herein shall be described again below with a different formulation.

By way of example, the vehicle 100 is equipped with a driver assistance function that knows the route the vehicle 100 is travelling. A current position of the vehicle 100 is shown on the map 106 by means of the device 102. The map 106 is shown in a narrow form, for example, such that a tight curve may appear to be a nearly straight line. It is possible to maintain a relatively high speed, even with poor visibility, via a sensor fusion of cloud data containing the individual road users and the respective traffic obstructions, in combination with data from environment sensors, e.g., lidar sensors or infrared cameras. The driver reaction time is calculated, for example, using a reaction test carried out in advance, in order to adapt the system to the respective driver. The reaction time of the driver is then added to a reaction time of the vehicle 100 in reacting to a driver command. This sum then represents one minute of prior warning time. The minimal prior warning period is used as the critical time for the emergency braking driver assistance function. A maximum prior warning period is greater than the minimum prior warning period by a specific factor, e.g., a factor of 10.

Optionally, the aspect ratio of the map 106 is adjusted in relation to the current speed of the vehicle 100, i.e., the map is distorted by either lengthening or shortening it. By way of example, the system is automatically switched on in fog in order to offer the driver an alternative view. The system can also be always on, or it can be switched on by the driver.

The display in the form of the map 106 is superimposed vertically on the windshield 108 at the side, over the entire height thereof, such that the individual lanes are shown parallel to one another. The respective lane in which the vehicle is travelling is indicated by a thick frame or a brighter light. At the same time, a vertical line indicating the latest possible intervention of the driver forms the driver intervention marker 120. Another line indicates the point in time for the intervention of the emergency braking driver assistance function, also referred to as the emergency braking marker 118 above. The actual position of the vehicle 100 only moves horizontally in the map 106. The other road users or obstacles approach the vehicle accordingly. The driver intervention marker 120 is superimposed as a vertical arrow parallel to the driving lane. The arrow points downward. As the vehicle 100 approaches an obstacle, the arrow moves down, until reaching the horizontal strip of the emergency braking driver assistance function. The vehicle 100 is automatically braked at this point.

It is also possible, when approaching a hazard when parking, that the display is either moved slightly, so that it is in the direct line of sight of the driver, and thus becomes clearer, such that the driver can continue to observe the street, and nevertheless remain informed, or the display is enlarged laterally, optionally with different transparencies, depending on the extent of the lateral extension of the display, either directly proportionally or indirectly proportionally thereto, depending on where the hazard is located that the driver must pay attention to. The display advantageously does not obstruct the driver's view.

Because a vehicle that has such a system can move faster in poor weather conditions, the driver assistance system recommends, for example, that the vehicle travel in a middle lane, because slow vehicles normally travel in the right-hand lane. This has the advantage that the driver does not need to concentrate as much on the speed and the longitudinal guidance. By using the middle lane, the vehicle is less likely to come across obstacles in such weather conditions.

Optionally, a recommendation to change lanes can be indicated by flashing a lane in the display before the drive can see any obstacles.

An alternative display is superimposed horizontally to the middle of the windshield 108 on the driver's side, as is shown in FIG. 2. An obstacle is enlarged or reduced in proportion to its distance to the vehicle 100. In contrast to reality, it is superimposed earlier, on the basis of the reaction time. As a result, the object will appear closer than it actually is to the driver. The driver will be able to react more quickly, thus substantially restricting the use of the emergency braking drive assistance system. A premature or unnecessary triggering of the emergency braking driver assistance function can thus be prevented.

If the vehicle's vision is limited due to sensor failures resulting from extremely poor weather conditions, for example, or due to the topography of the roadway, e.g., in tight curves, or due to a lack of cloud data, e.g., because of the absence of internet service, or because the occupancy of a lane is not reported, an upper part of the map is crossed out in the vertical depiction of the map 106, in order to mask it. As a result, the driver can adjust his speed accordingly, until the masked region of the map partially or entirely disappears.

The approach presented herein has the advantage that the driver can decide in advance, based on the additional depiction in the map 106, whether a (semi) autonomous vehicle control of the vehicle 100 is useful or not. The driver can thus make corrections at the appropriate time, early enough to avoid an accident.

The display can also be projected horizontally. A vehicle that may not exist can be shown to the driver at a point where the vehicle's view ends. This allows the driver to anticipate a possible hazard.

The display that is used should be transparent, so that it does not restrict the driver's view unnecessarily.

Figure 3:
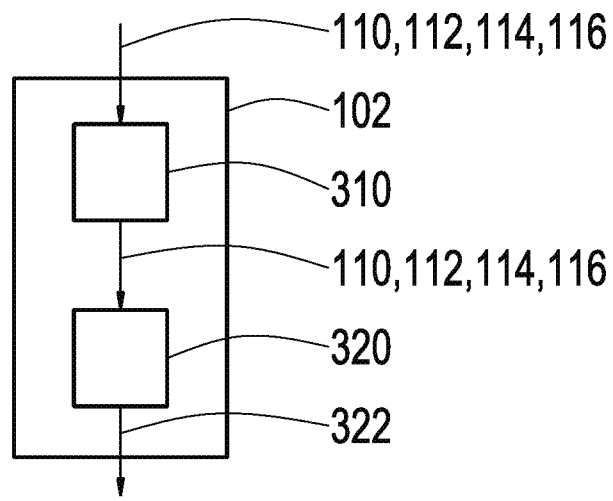
FIG. 3 shows a schematic illustration of a device according to an exemplary embodiment.

FIG. 3 shows a schematic illustration of a device 102 according to an exemplary embodiment, such as the device described above in reference to FIGS. 1 and 2. The device 102 comprises an input unit 310 for inputting speed data 110, environment data 112, the driver's reaction time 114, and the emergency braking reaction time 116. The input unit 310 inputs the speed data 110 or the environment data 112 via an interface for sensors in or on the vehicle, and/or via a communication interface for communicating with other road users. The device 102 also has a superimposing unit 320 that is configured to superimpose the emergency braking marker and the driver intervention marker 120 on the basis of the data input via the input unit 310, by outputting a corresponding display control signal 322.

Figure 4:
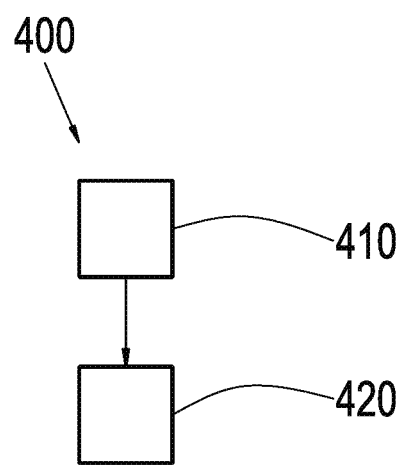
FIG. 4 shows a flow chart for a method according to an exemplary embodiment.

FIG. 4 shows a flow chart for a method 400 according to an exemplary embodiment. The method 400 for displaying safety-relevant information on a display device of a vehicle can be executed using the device described above in reference to FIGS. 1 to 3. The speed of the vehicle, the environment data, the driver reaction time, and emergency braking reaction time are input in step 410. The emergency braking marker and the driver intervention marker are superimposed in step 420, based on the speed, the environment data, the driver reaction time, and the emergency braking reaction time, on the map representing the roadway on which the vehicle is travelling, in the display device in a corresponding manner.

The exemplary embodiments shown in the figures are selected merely by way of example. Different exemplary embodiments can be combined with one another, either in their entirety or with respect to individual features. An exemplary embodiment can also be supplemented by features of another exemplary embodiment. Furthermore, the method steps according to the present disclosure can be repeated or executed in a sequence other than that described herein.

If an exemplary embodiment comprises an "and/or" conjunction between a first feature and a second feature, this can be read to mean that the exemplary embodiment according to one embodiment contains both the first feature and the second feature, and according to another embodiment, contains either just the first feature or just the second feature.

REFERENCE SYMBOLS 100 vehicle
102 device
104 display device
106 map
108 windshield
110 speed data
112 environment information
114 driver reaction time
116 emergency braking reaction time
118 emergency braking marker
120 driver intervention marker
122 object symbol
124 lane marking
126 not visible region
200 grid
202 lane marking
204 lane change marker
310 input unit
320 superimposing unit
322 display control signal
400 method
410 input step
420 superimposing step

The invention claimed is:

1. A method for displaying safety-relevant information on a display device of a vehicle, the method comprising:
    inputting a speed of the vehicle, an environment data representing an environment of the vehicle, a driver reaction time that represents a reaction time of a driver of the vehicle determined in a reaction test, and an emergency braking time that represents a reaction time of an emergency braking driver assistance function of the vehicle in response to detection of an emergency braking situation; and
    superimposing an emergency braking marker and a driver intervention marker on a map in the display device representing a roadway on which the vehicle is travelling, based on the speed, the environment data, the driver reaction time, and the emergency braking reaction time,
    wherein the emergency braking marker represents at least one of a first future point in time or a first future location for an intervention of the emergency braking driver assistance function, and wherein the driver intervention marker represents at least one of a second future point in time or a second future location for a latest possible intervention of the driver prior to the intervention of the emergency braking driver assistance function.

2. The method according to claim 1, further comprising changing a distance between the driver intervention marker and the emergency braking marker based on a change in a distance between the vehicle and an object in the environment.

3. The method according to claim 1, further comprising superimposing an arrow at least one of parallel to the roadway or pointing toward the emergency braking marker as the driver intervention marker.

4. The method according to claim 1, further comprising superimposing a line crossing the roadway as the emergency braking marker.

5. The method according to claim 1, further comprising adjusting an aspect ratio of the map based on the speed.

6. The method according to claim 1, further comprising determining the emergency braking reaction time by adding the driver reaction time to a vehicle reaction time that represents a reaction time for the vehicle for processing a driver command.

7. The method according to claim 1, further comprising projecting at least one of the emergency braking markers or the driver intervention marker onto a windshield of the vehicle.

8. The method according to claim 1, further comprising highlighting on the map a lane in which the vehicle is travelling.

9. The method according to claim 1, further comprising superimposing on the map at least one object symbol representing an object located on the roadway.

10. The method according to claim 9, wherein a size of the at least one object symbol changes based on a change in a distance between the vehicle and the object.

11. The method according to claim 1, further comprising masking in the map a region of the environment that is not visible to the driver.

12. A non-transitory machine-readable storage medium storing thereon a computer program that, when executed by a computing device, causes the computing device to perform a method comprising:
   inputting a speed of a vehicle, an environment data representing an environment of the vehicle, a driver reaction time that represents a reaction time of the driver of the vehicle determined in a reaction test, and an emergency braking time that represents a reaction time of an emergency braking driver assistance function of the vehicle in response to detection of an emergency braking situation; and
   superimposing an emergency braking marker and a driver intervention marker on a map in a display device representing a roadway on which the vehicle is travelling, based on the speed, the environment data, the driver reaction time, and the emergency braking reaction time,
   wherein the emergency braking marker represents at least one of a first future point in time or a first future location for an intervention of the emergency braking driver assistance function, and wherein the driver intervention marker represents at least one of a second future point in time or a second future location for a latest possible intervention of the driver prior to the intervention of the emergency braking driver assistance function.

13. A device for displaying safety-relevant information on a display device of a vehicle, the device comprising:
   an input unit configured to receive an input of a speed of a vehicle, an environment data representing an environment of the vehicle, a driver reaction time that represents a reaction time of a driver of the vehicle determined in a reaction test, and an emergency braking time that represents a reaction time of an emergency braking driver assistance function of the vehicle in response to detection of an emergency braking situation; and
   a superimposing unit configured to superimpose an emergency braking marker and a driver intervention marker on a map in the display device representing a roadway on which the vehicle is travelling, based on the speed, the environment data, the driver reaction time, and the emergency braking reaction time,
   wherein the emergency braking marker represents at least one of a first future point in time or a first future location for an intervention of the emergency braking driver assistance function, and wherein the driver intervention marker represents at least one of a second future point in time or a second future location for a latest possible intervention of the driver prior to the intervention of the emergency braking driver assistance function.

14. The device according to claim 13, wherein the superimposing unit is further configured to change a distance between the driver intervention marker and the emergency braking marker based on a change in a distance between the vehicle and an object in the environment.

15. The device according to claim 13, wherein the superimposing unit is further configured to superimpose an arrow at least one of parallel to the roadway or pointing toward the emergency braking marker as the driver intervention marker.

16. The device according to claim 13, wherein the superimposing unit is further configured to superimpose a line crossing the roadway as the emergency braking marker.

17. The device according to claim 13, wherein the superimposing unit is further configured to adjust an aspect ratio of the map based on the speed.

18. The device according to claim 13, wherein the superimposing unit is further configured to highlight on the map a lane in which the vehicle is travelling.

19. The device according to claim 13, wherein the superimposing unit Is further configured to superimpose on the map at least one object symbol representing an object located on the roadway.

20. The device according to claim 19, wherein a size of the at least one object symbol changes based on a change in a distance between the vehicle and the object.

* * * * *